United States Patent [19]
Pompei et al.

[11] Patent Number: 6,100,527
[45] Date of Patent: Aug. 8, 2000

[54] FAST RESPONSE RADIATION DETECTOR

[75] Inventors: Francesco Pompei, Boston; Janus Ternullo, Belmont, both of Mass.

[73] Assignee: Exergen Corporation, Watertown, Mass.

[21] Appl. No.: 09/290,284

[22] Filed: Apr. 13, 1999

Related U.S. Application Data

[62] Division of application No. 08/692,044, Aug. 2, 1996, Pat. No. 5,894,126.

[51] Int. Cl.$^7$ .................................................. G01J 5/24
[52] U.S. Cl. ...................................... 250/339.14; 250/342
[58] Field of Search ......................... 250/338.1, 339.04, 250/339.14, 340, 342, 346; 374/121, 137, 124

[56] References Cited

U.S. PATENT DOCUMENTS

| | | | |
|---|---|---|---|
| 3,718,757 | 2/1973 | Gulitz et al. ............................ | 374/124 |
| 4,831,258 | 5/1989 | Paulk et al. ........................... | 250/338.1 |
| 4,952,808 | 8/1990 | Turnbull et al. ........................ | 250/332 |
| 5,195,359 | 3/1993 | Kubota et al. ............................... | 73/35 |
| 5,894,126 | 4/1999 | Pompei et al. ........................ | 250/338.1 |

*Primary Examiner*—Seungsook Ham
*Assistant Examiner*—Richard Hanig
*Attorney, Agent, or Firm*—Hamilton, Brook, Smith & Reynolds, P.C.

[57] ABSTRACT

A thermally differentiable pattern such as hot melt adhesive is monitored in a production line system. An electrical output from a thermopile radiation sensor is applied to a detection circuit which processes the sensor electrical output to perform an inverse to the sensor transfer function and to perform a differentiation which provides a pulsed output at rising and falling edges of the sensor signal. Comparators provide respective output pulse signals representing the respective rising and falling edges. An adjustable amplifier in the circuit adjusts pulse threshold relative to sensed radiation.

3 Claims, 9 Drawing Sheets

FAST RESPONSE RADIATION DETECTOR

RELATED APPLICATIONS

This application is a Divisional application of U.S. Ser. No. 08/692,044 filed Aug. 2, 1996, now U.S. Pat. No. 5,894,126 the entire teachings of which are incorporated herein by reference.

BACKGROUND OF THE INVENTION

Temperature detection has become a significant measurement in product and process quality control. Radiation detectors are particularly useful because they provide a non-contact measurement which allows continuous measurement of an ongoing process such as product moving along a conveyor belt. Radiation sensors also provide a relatively fast response in the order of 100 milliseconds.

Temperature detection systems compare detected radiation with a reference. A difficulty arises where the background radiation in the system is not constant, thus requiring frequent recalibration of the system. For example, the radiation detector may view a continuous or intermittent bead of hot adhesive which has just been laid on a package to confirm that the adhesive is being laid properly. In a hot environment, the adhesive may only be a few degrees higher in temperature than the surrounding packaging, so a change in environmental temperature of only one or two degrees may place the detector out of calibration.

A solution to the problem of changing background temperature was presented in U.S. Pat. No. 4,831,258. In that system, two radiation sensors are provided to view adjacent target surfaces and provide a differential output. Accordingly, the reference level to which the principal radiation sensor is compared is that of the radiation from the surrounding environment. In a typical application, the principal radiation sensor would view a continuous or intermittent bead of adhesive while the reference sensor views an adjacent surface, the two sensors being positioned in line perpendicular to the direction of movement of the product being monitored.

Although the differential approach has been very successful, the 100 millisecond time constant of thermal radiation sensors, those such as thermopiles which convert radiation to thermal energy and thermal energy to electrical output, has limited their application to systems where the hot target to be sensed is very long or where the conveyor moves very slowly. Due to thermal time constants, the response of a thermal radiation sensor begins to fall at about 1.5 hertz. At higher frequencies more complex and expensive quantum photoelectric systems, which convert radiation directly to electrical output, have been required.

SUMMARY OF THE INVENTION

A significant aspect of the present invention is based on the recognition that a thermal radiation sensor can be viewed as a linear transfer function, specifically that of an integrator in the case of a thermopile, and that the square wave heat flux input to a sensor can be recovered through processing of an inverse transfer function, a differentiator in the case of a thermopile. By further processing the sensor electrical output through a second differentiation, a pulsed output with changes in the sensor electrical output can be obtained for faster response and edge location information.

By providing gain adjustment in a differentiating amplifier, a pulse threshold may be adjusted relative to the sensed radiation. In particular, the system may be operated in a range of operation where the amplitude of the signal applied to the threshold comparator is directly dependent on the differential heat flux received by the sensor, unaffected by input rise time.

In a preferred system, the detection circuit also includes a low pass filter having a relatively high cut-off point to remove noise above the frequencies to which the differentiator is tuned. Dual comparators detect the positive and negative spikes which result from rising and falling edges of the radiation sensor signal.

The invention is particularly useful to production lines in which an intermittent signal must be detected at high frequency as, for example, where an intermittent bead of hot melt adhesive is applied.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
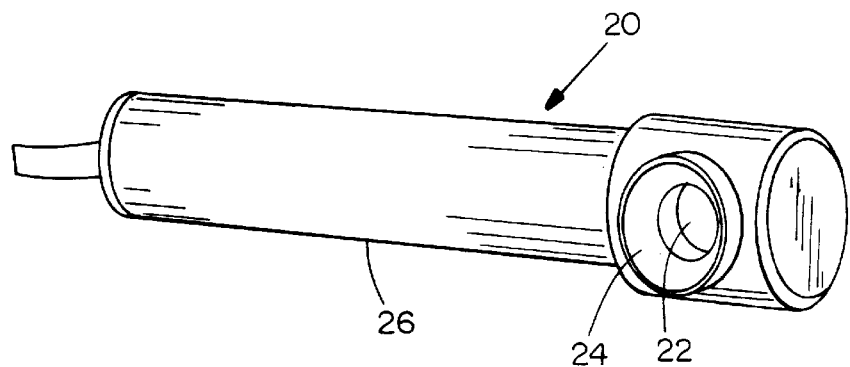
FIG. 1 is a perspective view of a radiation detector embodying the present invention.

FIG. 1 illustrates a side viewing radiation detector 20 embodying the present invention. It includes a thermopile type radiation sensor mounted behind a window 22. The window is at the base of a low emissivity cone 24 which provides for emissivity compensation as disclosed in U.S. Pat. No. 4,636,091. The detection circuit is housed in the cylinder 26.

Figure 2:
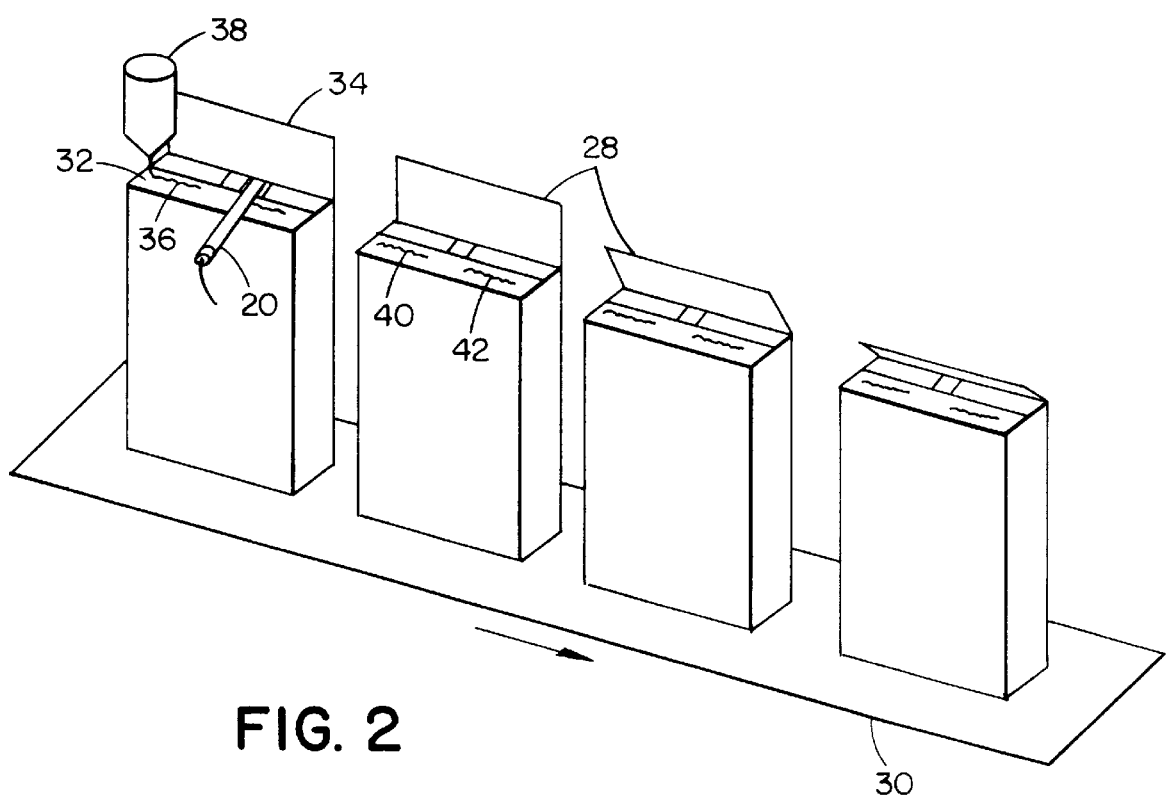
FIG. 2 is a perspective illustration of use of the detector of FIG. 1 in monitoring hot melt adhesive as it is applied to packages moving along a conveyor belt.

FIG. 2 illustrates an application of the side viewing detector of FIG. 1 to a hot melt adhesive system. In FIG. 2 packages 28 move from left to right on a conveyor belt 30. One flap 32 at the top of each package is closed while the other flap 34 remains open. Hot melt adhesive 36 is applied from a source 38 intermittently in order to provide separate beads 40 and 42 along the closed flap. Further down the assembly line, the flap 34 is closed against the hot melt adhesive as illustrated to the right of FIG. 2.

In accordance with the present invention, the radiation detector 20 is positioned just downstream of the adhesive supply 38. By monitoring the temperature of the adhesive, it can be confirmed that the correct amount of adhesive has been properly positioned on each package. When the signals drop below certain thresholds, because of failure of the adhesive system, the assembly line can be stopped for repair or system adjustments can be made.

Figure 3A:
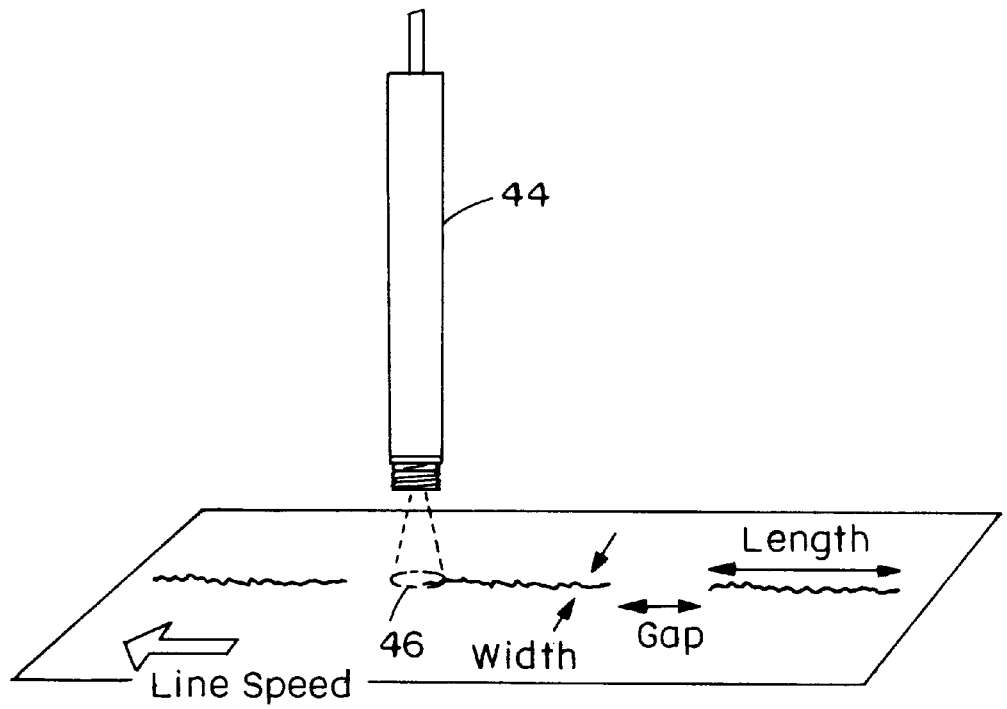
FIG. 3A is an illustration of an in-line radiation detector embodying the invention.
Figure 3B:
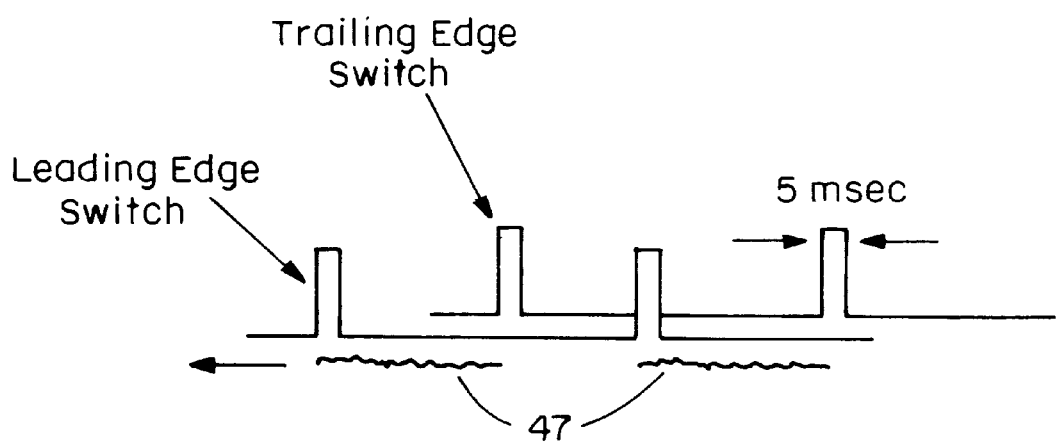
FIG. 3B is an illustration of the output signals from the radiation detector plotted against the hot melt adhesive.

FIGS. 3A and 3B present another application of the invention to hot melt adhesive. In this case, the detector 44 is of a straight viewing type, but preferably includes the thermopile sensor and emissivity compensation cone as in the FIG. 1 embodiment. As can be seen in FIG. 3A, the field of view 46 of the radiation detector is limited to a small region surrounding the hot melt adhesive 47 as it passes by. The signal strength sensed by the radiation sensor within the detector is a function of both the temperature of the adhesive and the width of the adhesive bead. The required response time of the radiation detector is a function of the length of each adhesive bead, the gap between beads, and the line speed. Prior radiation detectors have attempted to follow the temperature of the target being viewed and have compared the sensed signal to a reference level. However, the thermal time constants in such a system delay the change in sensor signal and require that the adhesive or gap temperature be maintained for at least 100 milliseconds before an accurate threshold measurement can be made. With increasing line speeds, such a delay is not acceptable. For example, FIG. 4A$b$ models the radiation input to a typical system, presenting a 10° F. step (illustrated as a 0.25 millivolt steady state sensor output) for 50 milliseconds and a cycle time of 150 msec. As shown in the lower plot of FIG. 4A$a$, the sensor output only rises to about 100 microvolt (right axis) over 50 msec. Though that level could be amplified and detected, it can be seen that at less than 10 msec., the sensor output would be very difficult to detect. Further, the sensor does not fully recover over the next 100 msec., so the output rises with each pulse.

In a thermopile, radiation flux is converted to thermal energy, heating the hot junction of the thermopile, and that energy is converted to electrical energy, a voltage output. To first approximation through six orders of magnitude, for example, $10^{-4°}$ C. to $10^{2°}$ C. of target temperature, the transfer function is a linear function, that of an integrator. Accordingly, the original heat flux waveform can be reconstructed from the electrical output of the sensor through an inverse transfer function which is itself a linear function, a differentiator. Applying the differentiating function to the output of the thermopile sensor increases the response time at the output.

Note that the heat flux itself is a non-linear function of target temperature. Further processing of the signal can account for that non-linear function, but in most control applications where the control limits temperature to within a few degrees, a linear approximation is even appropriate for that transfer function.

Figure 4A:
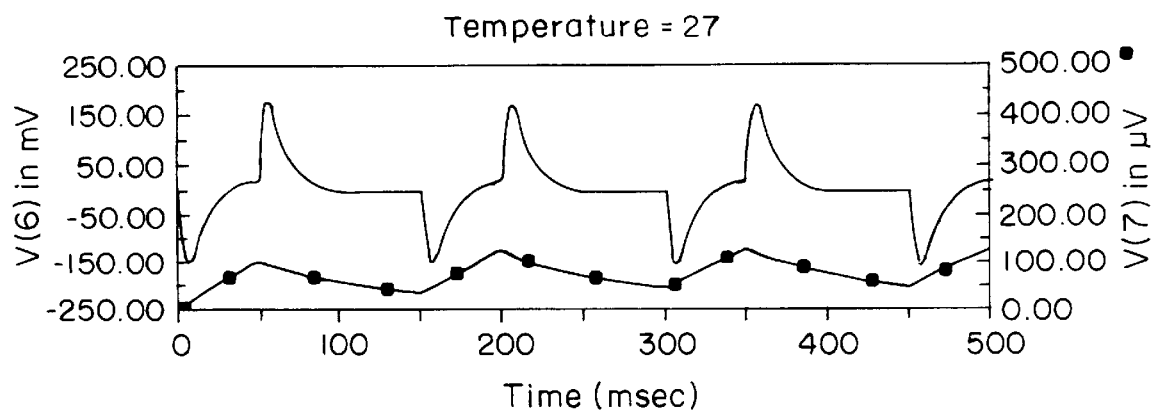
FIGS. 4A$a$, 4A$b$ and 4B–4F illustrate signals applied to output comparators of the radiation detector, illustrating response of the radiation sensor and differentiator and amplifying circuits within the detector.
Figure 4A:
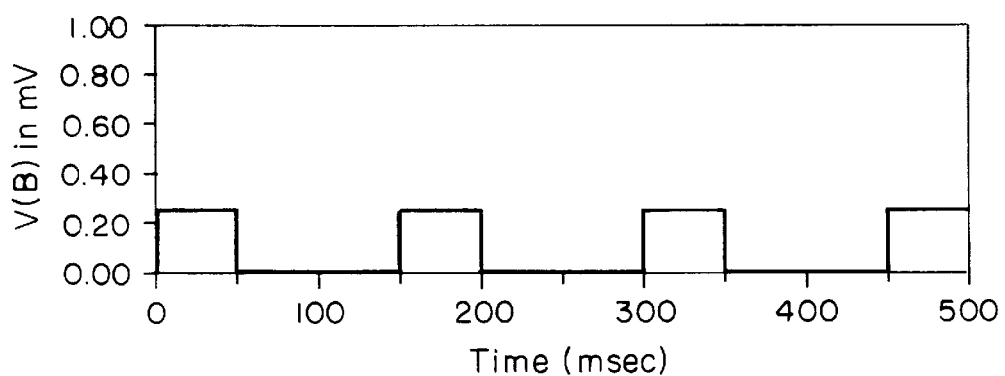

In accordance with another aspect of the present invention, the detector circuit includes a second differentiator which provides a spiked output with rapid changes in temperature, that is, at the leading and trailing edges of the adhesive as illustrated in the top plot of FIG. 4A$a$. Not only does such a system provide a higher frequency response, but it also provides leading and trailing edge position signals as illustrated in FIG. 3B. Whereas prior systems would have provided a high output throughout the detected length of the adhesive, within thermal time constant limits, the present invention provides separate leading and trailing edge signals. Those signals may be used to trigger switches for more precise system control.

In a preferred embodiment, the inverse transfer function is processed in a differentiating adjustable gain amplifier and the edge pulses are generated in a leading differentiating circuit. However, both functions could be performed in a single amplifier designed to perform as a high pass filter with second order slope. Alternatively, one or both functions can be performed digitally, either separately or in a combined algorithm.

Figure 5A:
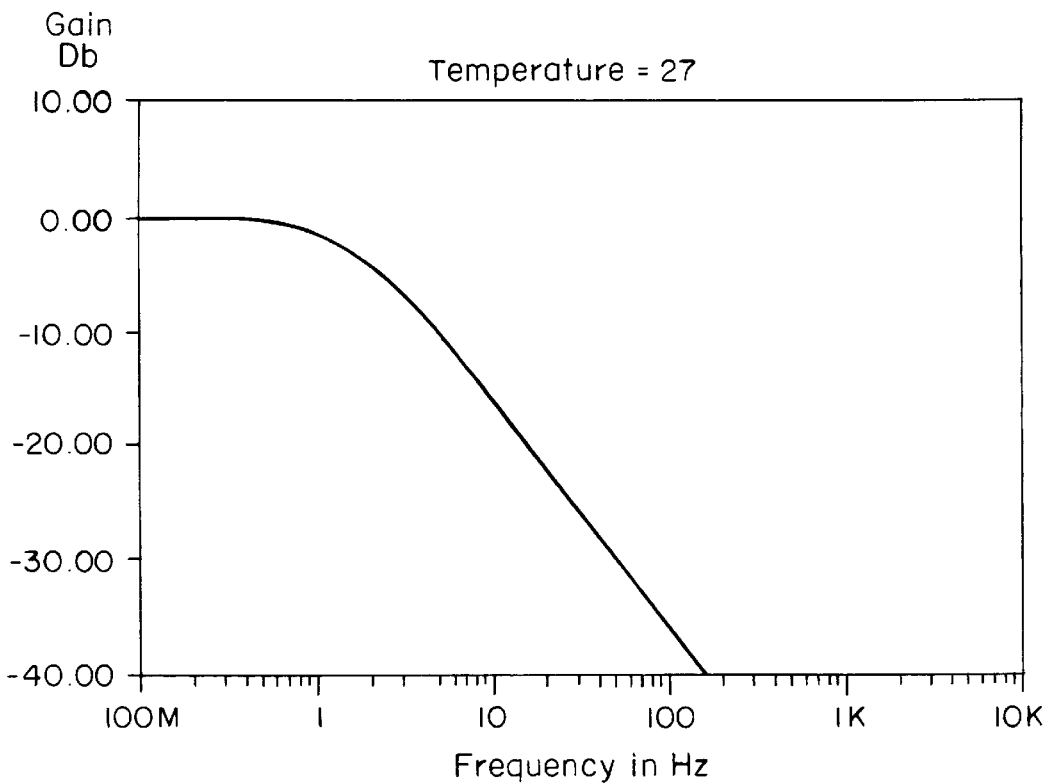
FIGS. 5A–D illustrate the individual and combined frequency response of the radiation sensor, differentiator and amplifier circuits of the radiation detector.
Figure 5B:
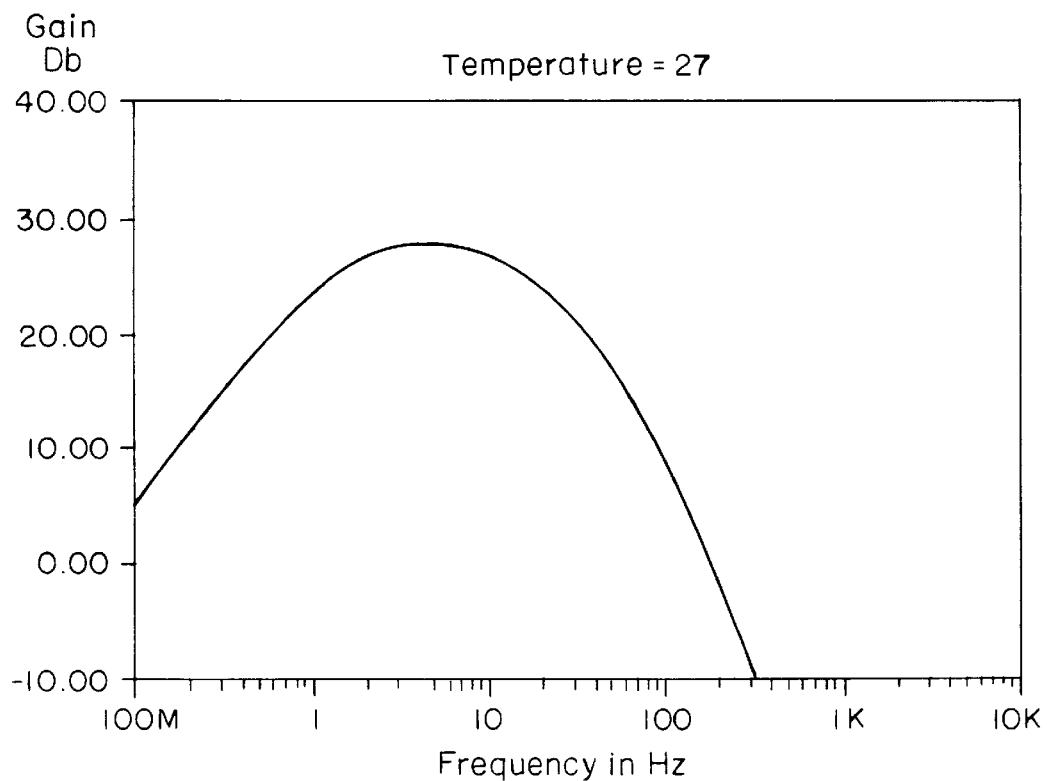
Figure 5C:
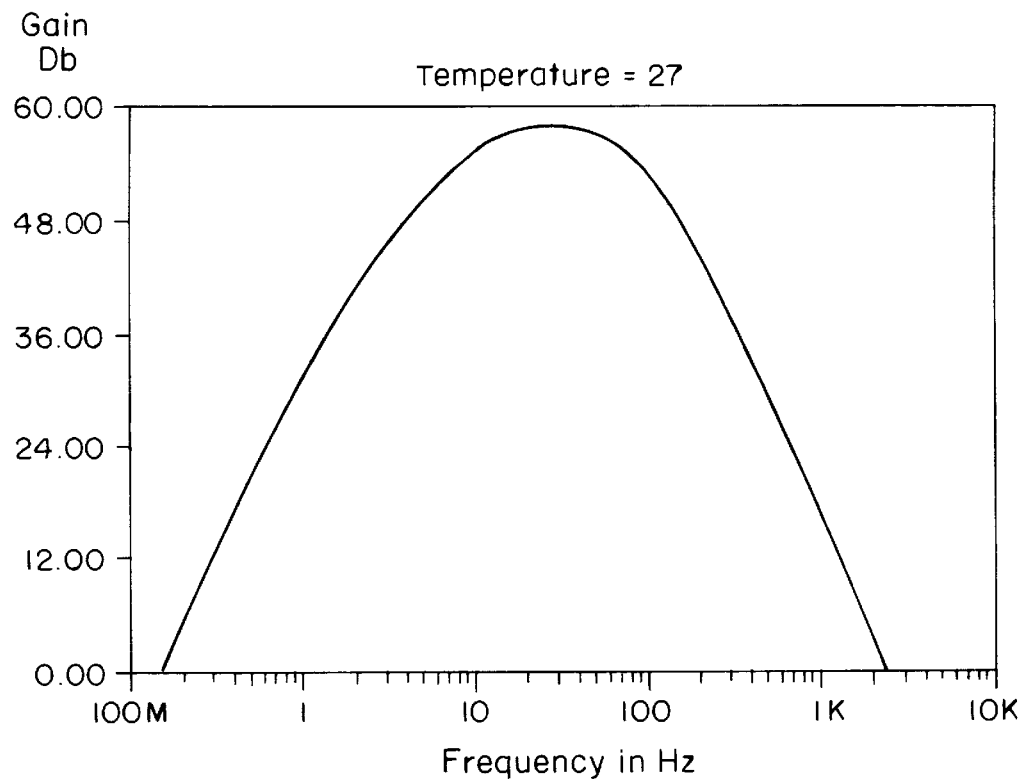

FIG. 5C illustrates the combined effects of the decreasing frequency response of the radiation sensor and the higher frequency response of the inverse function and the pulse generating differentiator circuits, and can be compared to the frequency response of the sensor alone in FIG. 5A. These effects combine to provide a maximum gain of about 30 hertz in this particular design with comer frequencies at about 10 hertz and 80 hertz for a bandwidth of about 70 hertz; whereas, conventional infrared radiation detectors are limited to a low frequency bandwidth of about 1.5 hertz.

Figure 6:
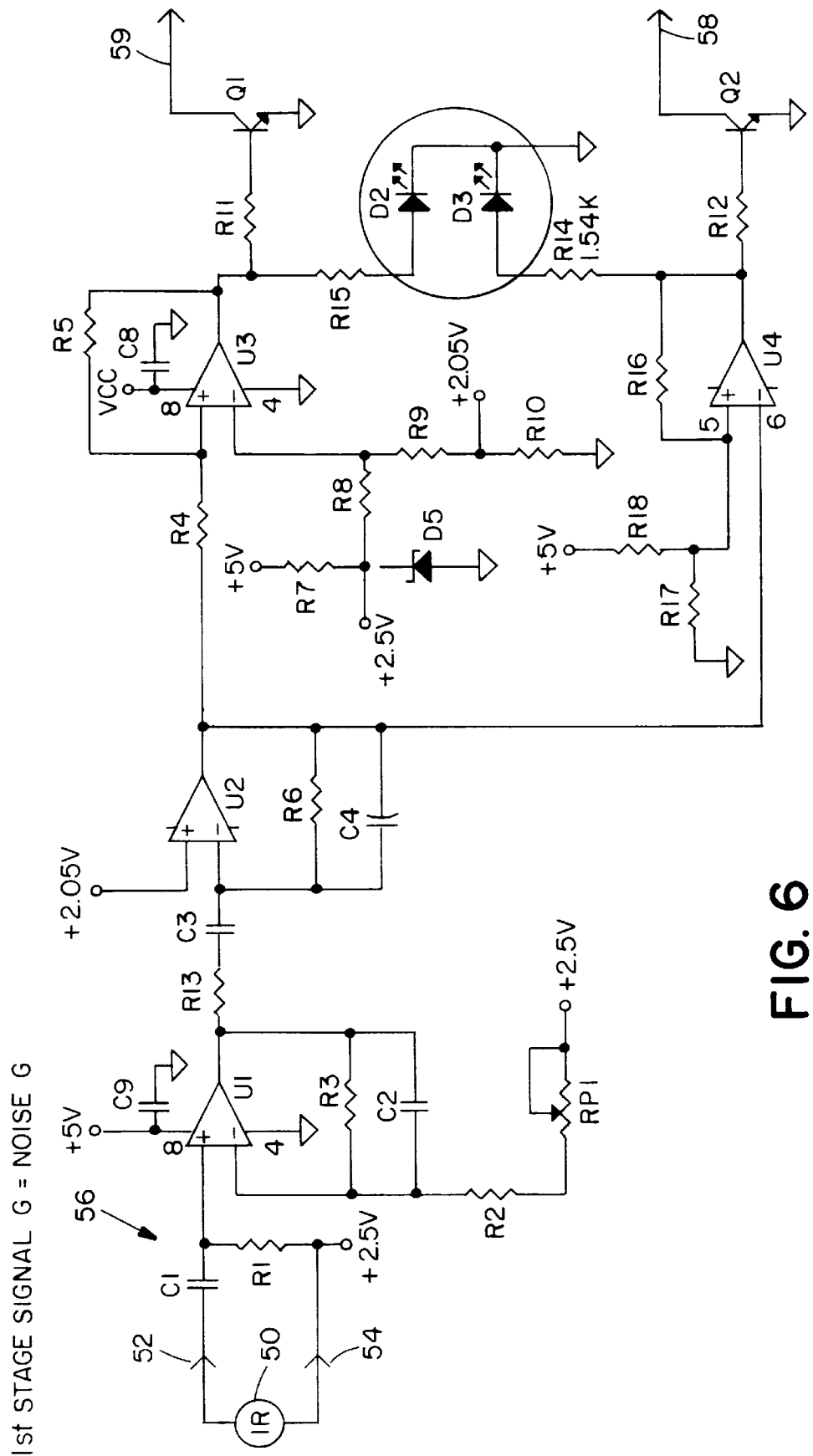
FIG. 6 is an electrical schematic of the radiation detector of FIG. 1.

FIG. 6 illustrates a preferred detection circuit in accordance with the present invention. The voltage signal across a conventional thermopile 50 is applied to inputs 52 and 54. Alternatively, the radiation sensor could be an infrared thermocouple such as disclosed in U.S. Pat. No. 5,528,041 or a pyroelectric device or other heat sensor. The sensor output is applied to a high pass filter circuit 56 comprising a capacitor C1 and resistor R1 which functions as a non-ideal differentiator. It has a comer frequency of 15 hertz, thus ignoring slow changes in input and responding to sharp changes in input. Although not a pure differentiator, the circuit is designed to provide a positive pulse at the rising edge of a stepped signal and a negative pulse at the falling edge of a stepped signal. The output of the differentiator 56 is applied to an amplifier U1 which provides the first stage of gain. Resistor R3 and capacitor C2 coupled across the amplifier U1 provide low pass filtering with a cut-off point of about 94 hertz. That cut off serves to filter out the high noise signals above the design bandwidth of the circuit. A potentiometer RP1 is provided for gain adjustment ranging from 5 to 250. The frequency response at the output of amplifier U1 is presented in FIG. 5B.

Figure 5D:
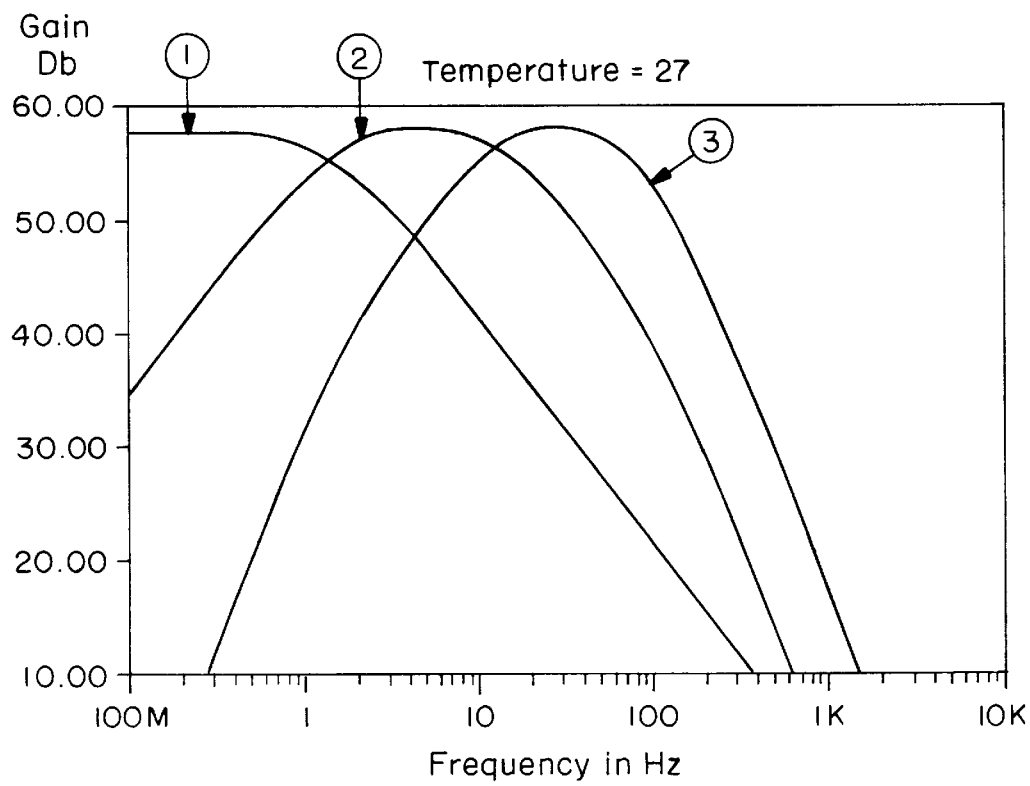

The output of amplifier U1 is input to the second stage amplifier U2 through a capacitor C3. To first approximation, the gain of the amplifier U2 is the ratio of the impedance of R6 to the impedance of C3, or the product R6C3j$\omega$. It can be seen, then, that with increasing frequency w the second stage gain increases. The differentiating amplifier circuit approximates an inverse transfer function to the thermal radiation sensor. Resistor R6 and parallel capacitor C4 provide additional low pass filtering with a cut-off point of about 84 hertz. The frequency response at the output of amplifier U2 is illustrated in FIG. 5C. For comparison, the individual graphs of FIGS. 5A, B and C, normalized to 57.5 dB, are presented together in FIG. 5D.

The output of the inverting amplifier U2 includes falling and rising spikes with the leading and trailing edges of the incoming signal as, for example, illustrated in FIG. 4A$a$. That signal is applied to respective comparators U3 and U4. The reference signals to those comparators are derived through respective voltage divider circuits from the 5 volt supply. A zener diode D5 provides a 2.5 volt supply to the remainder of the circuit from the 5 volt supply.

When the input to U4 goes negative by the amount indicated by its reference input, its output goes high in order to turn on a red light emitting diode D3 positioned at the end of the detector. That high output also turns on a transistor Q2, pulling an output 58 low to signal the leading edge of the adhesive to a controller. Similarly, when the rising spike at a trailing edge exceeds the reference input to U3, the output of U3 goes high. This turns on green LED D2 and turns on output switch Q1, pulling output 59 low.

FIGS. 4A–4F, based on system modelling, illustrate the response of the circuit at the output of amplifier U2 to various conditions of the adhesive. The input to the system was modelled as a pulse generator with a 250 microvolt zero to peak amplitude. The sensor was modelled as a single poll low pass filter with a poll at 1.59 hertz, and the amplifier circuit is a microcap simulation of the circuitry from input to the sensor to the output of U2. Accordingly, the model includes the response of the radiation sensor, differentiator circuit and amplifiers, but not the comparator circuit. The response is shown for a particular implementation having a center frequency of about 30 hertz and corner frequencies of about 10 hertz and 80 hertz as illustrated in FIG. 5C. However, it will be recognized that, by appropriate selection of circuit parameters, different center frequency and bandwidth can be obtained.

For this implementation, the analysis shows that, for input rise times of 15 milliseconds or less, gain is 600; that is, a 1 microvolt edge produces a 600 microvolt spike. For input rise times slower than 10 milliseconds, the gain rolls off linearly; that is, the gain at 50 milliseconds is 200 and the gain at 100 milliseconds is 100. For extremely fast rise times, the system can respond no faster than 5 milliseconds. Therefore, the step in input must hold for 5 milliseconds to get peak output. Bandwidth from input to output is 10 hertz to 90 hertz with a midband gain of 58 db. The low frequency limits the slow rise time response, while the high frequency limits the edge to edge cycle time response. All analysis was performed at maximum gain.

The thresholds for the output comparators are preferably set at ±200 millivolts. Thus, with a 15 millisecond or faster edge, a temperature delta equivalent to 330 microvolts is required to trigger the output.

FIG. 4A*a* illustrates the response to a 250 microvolt pulse (FIG. 4A*b*) with a 1 millisecond edge rise time, 50 millisecond pulse width, and 150 millisecond cycle time. Again, the input is the input to the infrared sensor. It can be seen that pulses of minus and plus 150 millivolts are obtained at the output of amplifier U2. At about 25 microvolts per degree Fahrenheit, the input represents a change of about 10 degrees in temperature.

Figure 4B:
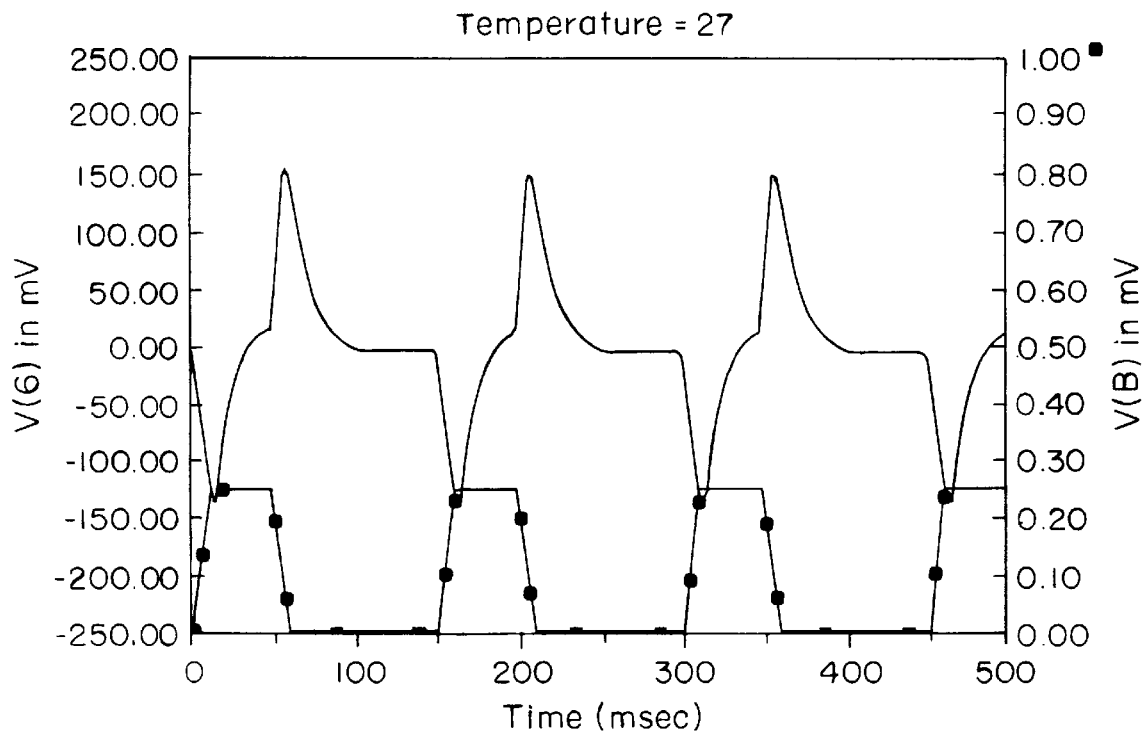

FIG. 4B shows the response with an input similar to that in FIG. 4A except that a slower 10 millisecond rise time is provided at the input.

Figure 4C:
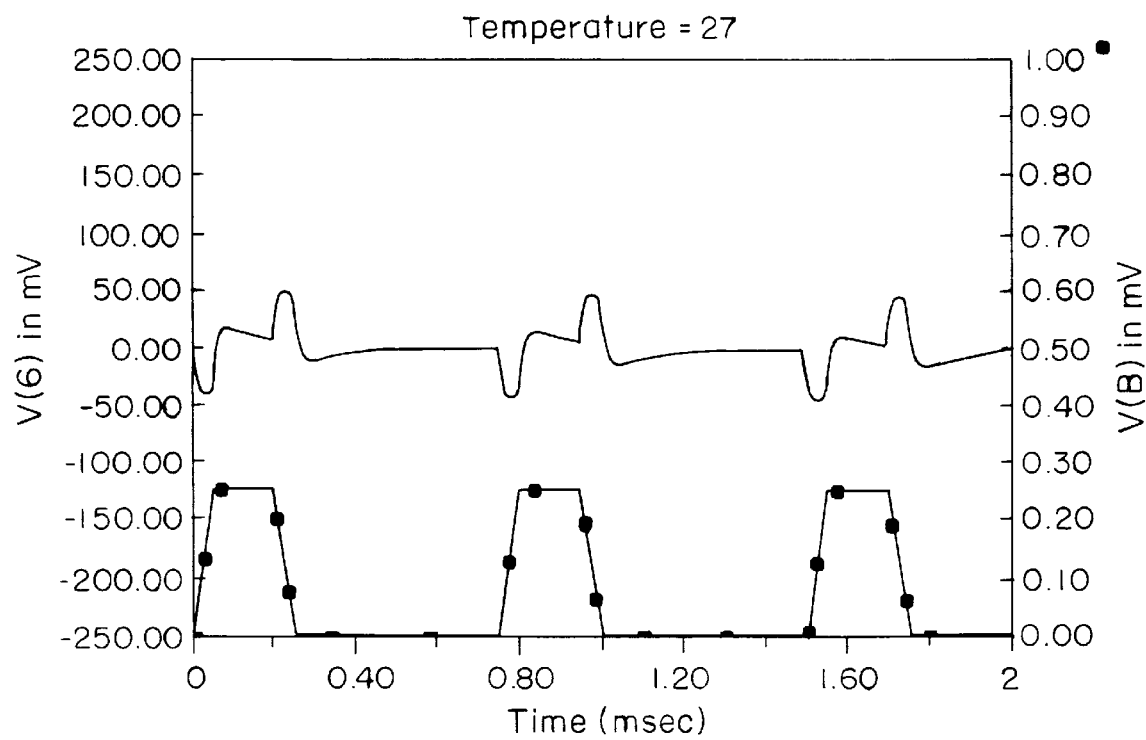

FIG. 4C shows how sensitivity decreases as rise time gets too slow. The input rise time is 50 milliseconds, pulse width is 200 milliseconds, and cycle time is 750 milliseconds.

The amplitude of the output pulse is effected by the amplitude of the input as well as the rise time of the input. Accordingly, the circuit provides the non-intuitive result of improved performance as the speed of the conveyor increases within the limits of the system. By contrast, a slower system will result in lower amplitude output as illustrated in FIG. 4C.

Figure 4D:
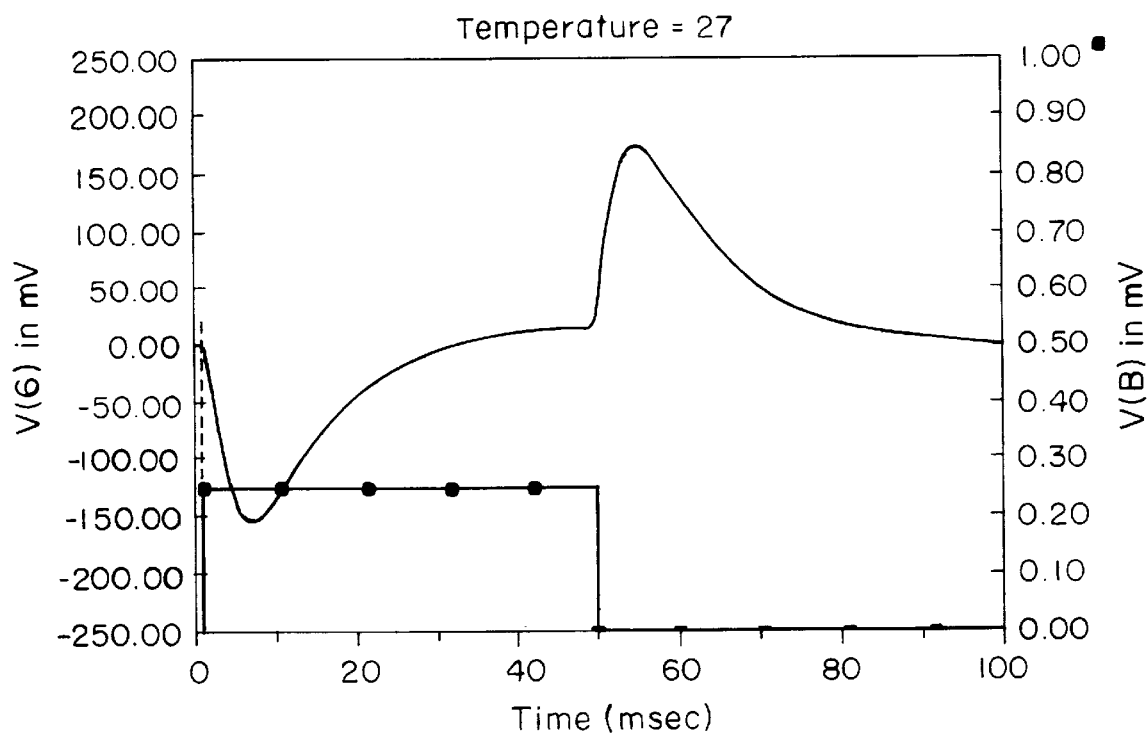

FIG. 4D shows the minimum time necessary to respond to a step input. The input rise time is 1 microsecond, but the system requires 5 milliseconds to respond. The pulse width in this case is 50 milliseconds. As the rise time exceeds 5 milliseconds, the amplitude of the response will no longer increase for this particular design. In this preferred mode of operation, the amplitude of the output of amplifier U2 is directly related to the differential in energy received at the two levels by the sensor. Accordingly, with fixed reference levels applied to the threshold comparators U3 and U4, any gain adjustment through RP1 results in a change in the threshold of sensed radiation which results in a pulsed output. Even using a differentiating circuit, which is generally time dependent, the output is correctly related to just the differential signal level.

Figure 4E:
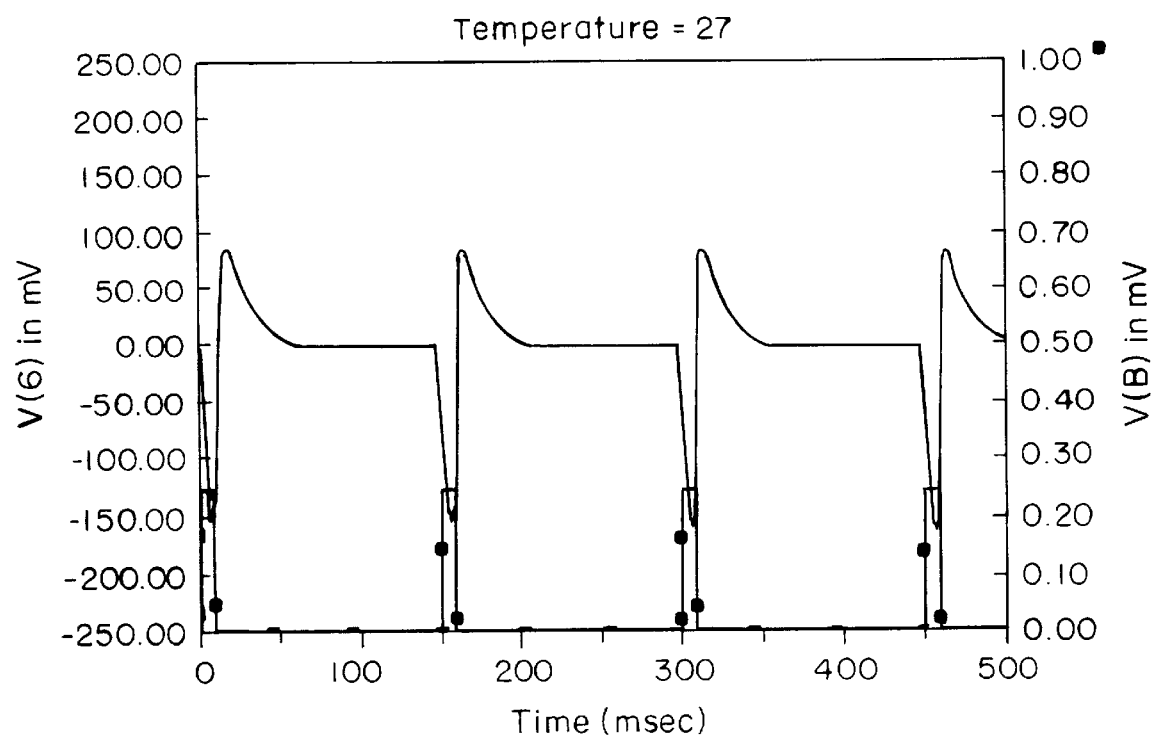

FIG. 4E shows the results of a pulse width which is too narrow. The system has not recovered from the first edge when the second edge occurs. Note the reduced response to this second edge. The pulse width is 10 milliseconds, and the rise time is 1 millisecond.

Figure 4F:
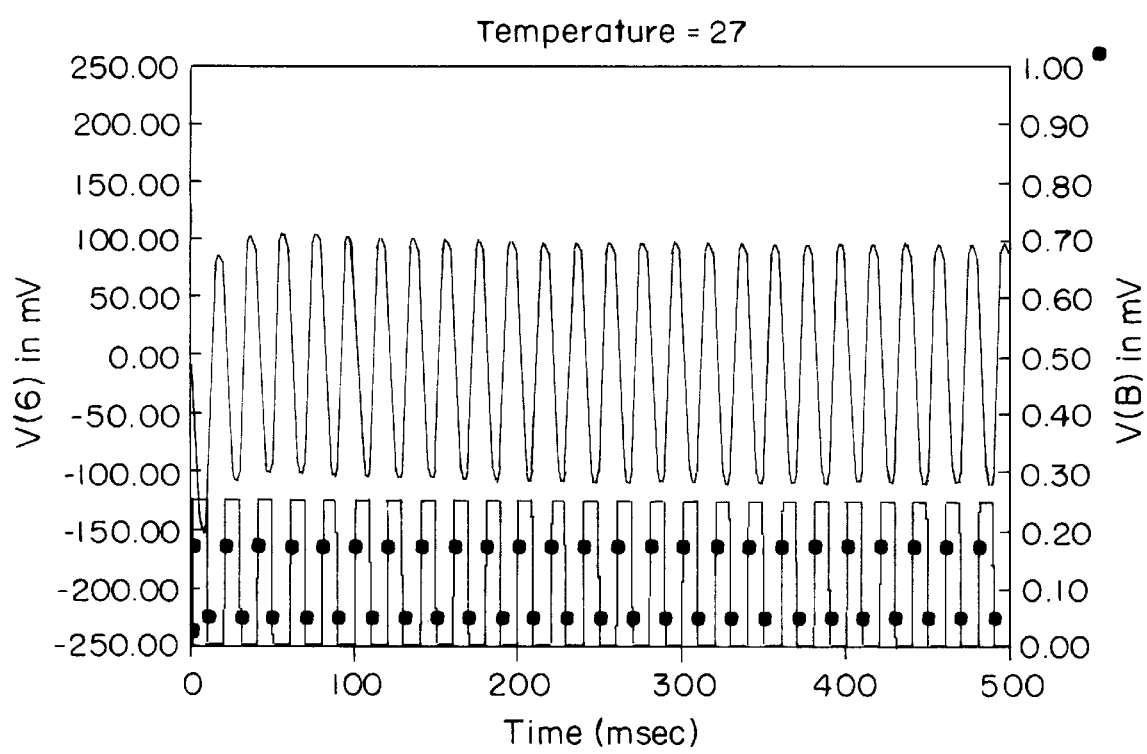

FIG. 4F shows the effect of too high a frequency at the input. The repetition rate does not allow time for the system to settle between edges. The output is that of a sine wave whose fundamental frequency only is in the range of a pass band filter. The input rise time is 1 millisecond, and the cycle time is 20 milliseconds (50 hertz).

While this invention has been particularly shown and described with references to preferred embodiments thereof, it will be understood by those skilled in the art that various changes in form and details may be made therein without departing from the spirit and scope of the invention as defined by the appended claims.

For example, the invention, though developed for hot melt adhesive systems, is applicable to any changing heat flux pattern.

What is claimed is:

1. A production line system comprising:
    an applicator which applies a thermally differentiable pattern to a substrate being moved along the production line; and
    a radiation detector which provides first and second outputs indicating leading and trailing edges of the thermally differentiable pattern, respectively, the radiation detector comprising:
        a radiation sensor having a transfer function providing an electrical output; and
        a radiation detection circuit receiving the electrical output of the radiation sensor and processing the sensor electrical output to perform an inverse to the sensor transfer function and to perform a differentiation which provides a pulsed output with changes in the sensor electrical output.

2. A production line system as claimed in claim 1 wherein the detection circuit further comprises gain adjustment to adjust a pulse threshold relative to sensed radiation.

3. A production line system as claimed in claim 1 wherein the thermally differentiable pattern comprises hot melt adhesive.

* * * * *